US010807591B1

(12) United States Patent
Kentley-Klay et al.

(10) Patent No.: US 10,807,591 B1
(45) Date of Patent: Oct. 20, 2020

(54) VEHICLE DISASTER DETECTION AND RESPONSE

(71) Applicant: Zoox, Inc., Menlo Park, CA (US)

(72) Inventors: Timothy David Kentley-Klay, Stanford, CA (US); Greg Zanghi, Santa Clara, CA (US); Jacob Lee Askeland, San Jose, CA (US); Ryan McMichael, Mountain View, CA (US); Mark R. Rosekind, Mountain View, CA (US)

(73) Assignee: Zoox, Inc., Foster City, CA (US)

( * ) Notice: Subject to any disclaimer, the term of this patent is extended or adjusted under 35 U.S.C. 154(b) by 263 days.

(21) Appl. No.: 15/802,441

(22) Filed: Nov. 2, 2017

(51) Int. Cl.
| | |
|---|---|
| *B60W 30/09* | (2012.01) |
| *B60W 10/20* | (2006.01) |
| *B60W 10/04* | (2006.01) |
| *B60W 30/18* | (2012.01) |
| *G08G 1/16* | (2006.01) |
| *G05D 1/02* | (2020.01) |

(52) U.S. Cl.
CPC ............ *B60W 30/09* (2013.01); *B60W 10/04* (2013.01); *B60W 10/20* (2013.01); *B60W 30/18009* (2013.01); *G05D 1/0214* (2013.01); *G08G 1/16* (2013.01); *B60W 2400/00* (2013.01); *B60W 2554/00* (2020.02); *B60W 2556/00* (2020.02)

(58) Field of Classification Search
CPC ...... B60W 30/09; B60W 10/04; B60W 10/20; B60W 30/18009; B60W 2400/00; B60W 2550/10; B60W 2600/00; G05D 1/0214; G08G 1/16

See application file for complete search history.

(56) References Cited

U.S. PATENT DOCUMENTS

| 7,049,952 | B2* | 5/2006 | Kulesz | G08B 21/12 |
| | | | | 340/506 |
| 8,531,316 | B2* | 9/2013 | Velado | G08B 25/08 |
| | | | | 340/984 |
| 9,591,676 | B1* | 3/2017 | Lopes | H04W 76/15 |
| 10,154,048 | B2* | 12/2018 | Krishnamurthi | G08G 1/0112 |
| 10,319,228 | B2* | 6/2019 | Silver | G08G 1/166 |
| 10,331,124 | B2* | 6/2019 | Ferguson | G05D 1/00 |
| 10,346,389 | B2* | 7/2019 | Davis | G06F 11/0709 |
| 2010/0279647 | A1* | 11/2010 | Jacobs | H04W 4/90 |
| | | | | 455/404.1 |

(Continued)

OTHER PUBLICATIONS

H.B. Wu et al., "Firefighting Robot With Video Full-Closed Loop Control", 2016, Int. J. of Safety and Security Eng., vol. 6, No. 2, pp. 254-269).*

(Continued)

*Primary Examiner* — Nicholas Kiswanto
(74) *Attorney, Agent, or Firm* — Lee & Hayes, P.C.

(57) ABSTRACT

Systems and processes for controlling a autonomous vehicle when the autonomous vehicle detects a disaster may include receiving a sensor signal from a sensor of a autonomous vehicle and determining that the sensor signal corresponds to a disaster definition accessible to the autonomous vehicle. The systems and processes may further include receiving a corroboration of the detected disaster and altering a drive mode of the autonomous vehicle or receiving an indication that the detected disaster was a false positive and returning to a nominal drive mode of the autonomous vehicle.

21 Claims, 8 Drawing Sheets

(56) References Cited

U.S. PATENT DOCUMENTS

| | | | |
|---|---|---|---|
| 2016/0050356 A1* | 2/2016 | Nalepka | G06K 9/00791 |
| | | | 348/148 |
| 2016/0231171 A1* | 8/2016 | Assefa | G01J 3/0272 |
| 2016/0257415 A1* | 9/2016 | Ye | B64D 17/00 |
| 2017/0131758 A1* | 5/2017 | Gettings | G06F 1/3287 |

OTHER PUBLICATIONS

Brad's blog, Planning for hurricanes and other disasters with robocars; http://ideas.4brad.com/planning-hurricanes-and-other-disasters-robocars; Sep. 6, 2017.

* cited by examiner

VEHICLE DISASTER DETECTION AND RESPONSE

BACKGROUND

Disaster, whether natural or not, may severely impact vehicles in commute when they strike. Some disasters, such as earthquakes, may not afford operators the appropriate amount of time to bring vehicles to safety or otherwise prepare. Further, disorder among these vehicles resulting from the disaster may further exacerbate safety concerns of both passengers, as well as other persons in the disaster zone.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1A:
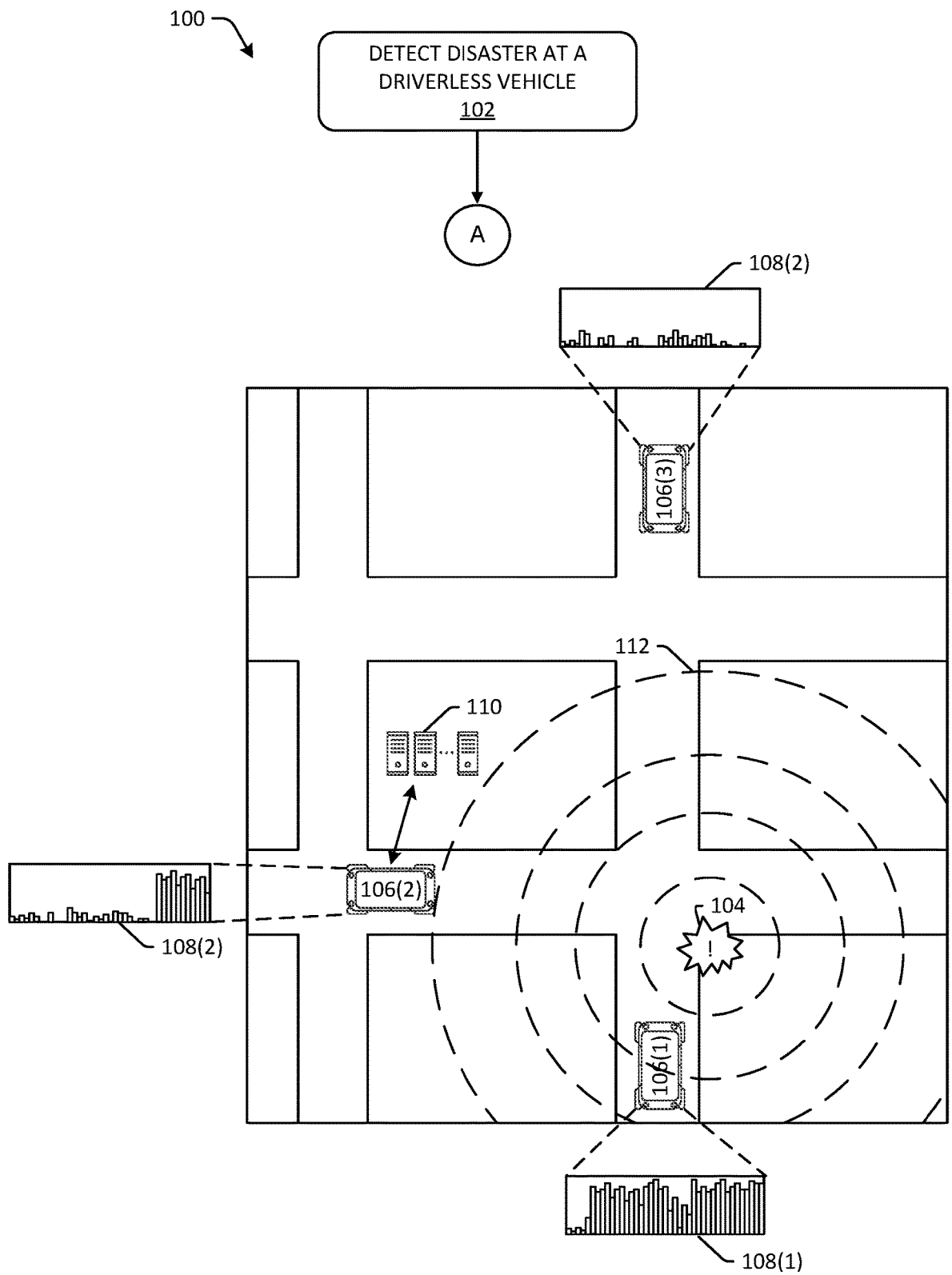
FIGS. 1A and 1B illustrate a pictorial flow diagram of an example process for using one or more autonomous vehicles to detect a disaster and controlling the one or more autonomous vehicles when a disaster has been detected.

This disclosure is generally directed to detecting a disaster (e.g., a natural disaster, man-caused disaster, or other catastrophic event) using one or more autonomous vehicles, as well as their subsequent control after a disaster is detected, or otherwise indicated. The techniques discussed herein may include detecting a disaster from sensor data generated by a autonomous vehicle, verifying that a disaster occurred, and/or altering operation of one or more autonomous vehicles of a fleet of vehicles depending on a type and/or state of the detected disaster.

In some examples, a autonomous vehicle may detect a disaster via sensor data collected by the autonomous vehicle and may generate a disaster identification based on the detection. For examples, techniques discussed herein may include detecting seismic activity using one or more autonomous vehicles of a fleet. In some examples, multiple autonomous vehicles may use sensor data received at different autonomous vehicles to corroborate and/or locate a disaster (e.g., verify that an earthquake has occurred, locate an epicenter of an earthquake). The autonomous vehicle may transmit the disaster identification to a remote computing device and/or another autonomous vehicle. In some examples, the disaster identification may include an indication of a type of disaster detected (e.g., cyclone, flood, seismic activity, fire, sinkhole, projectile collision, aberrant human activity, explosion, elevated radiation, tsunami, hurricane, volcanic activity, avalanche, landslide, insect infestation, etc.) and/or a state of the disaster (e.g., early warning (pre-disaster), ongoing, or post-disaster). In other words, the disaster identification may be treated as an unverified disaster detection or "potential" disaster.

In some examples, the autonomous vehicle may include a computing device having a memory with a disaster definition stored thereon and the computing device may be configured to generate a disaster identification from input sensor data. In some examples, the autonomous vehicle may otherwise have access to the disaster definition (e.g., by communicating with a remote computing device such as a cloud computing service). For example, a disaster definition may identify a state and/or type of a disaster and may include data characteristics that a processor of the autonomous vehicle may use to identify a state and/or type of a disaster from sensor data. In some examples, the computing device may be configured with previously machine-learned classifier and/or neural network, for example, in order to classify input sensor data as corresponding with a disaster identification.

For example, a disaster definition might identify a disaster type, "fire," with a disaster state "early warning" and include a data characteristic that specifies a threshold change in energy of current camera data compared to energy of previous camera data. This is discussed in more detail below. In an additional or alternate example, a disaster definition might identify a disaster type, "seismic activity," with a disaster state "ongoing" and include data characteristics that include a threshold acceleration magnitude and/or duration, and/or an acceleration profile of data received from an inertial measurement unit (IMU). This is also discussed in further detail below.

The techniques discussed herein may additionally or alternatively include verifying the disaster identification produced by the autonomous vehicle and/or identifying the disaster identification as a false positive. In some examples, the autonomous vehicle may transmit the disaster identification to another device (e.g., a remote computing device, such as a teleoperations device, or another autonomous vehicle) for the other device to provide corroboration of the disaster and/or an indication that the disaster identification is a false positive.

In some examples, the other device to which the autonomous vehicle transmits the disaster identification to corroborate the disaster identification may include a teleoperations device. The teleoperations device may be a device configured to respond to disaster identifications (e.g., a device that is configured with more extensive machine learning, has access to greater amounts of data, and/or has greater processing abilities or bandwidth, etc.). In additional or alternate examples, the teleoperations device may display information related to the disaster identification and/or other information that may be useful for corroborating the disaster identification to a remote operator ("teleoperator") and may include an interface for receiving input, such as an indication that the disaster identification is a true positive or a false positive, from the teleoperator. In some examples, the teleoperations device may respond to the autonomous vehicle and/or additional autonomous vehicles corroborating the disaster identification (i.e., identifying the disaster identification as a true positive) or identifying the disaster identification as a false positive. In some examples, the teleoperations device may also provide a command to alter a drive mode of one or more autonomous vehicles, based at least in part on corroborating the disaster identification.

In an additional or alternate example, the autonomous vehicle may transmit information, including the disaster identification, to a second autonomous vehicle. For example, the autonomous vehicle might detect that a network connection is not available to transmit the disaster identification to a teleoperations device, but may detect that the second autonomous vehicle is available via an ad hoc network established between the autonomous vehicle and the second autonomous vehicles. In response to receiving the disaster identification from the autonomous vehicle, the second autonomous vehicle may respond with a second disaster identification that the second autonomous vehicle has generated, if one was generated, or an indication that no such indication has been generated. In some examples, the second autonomous vehicle may also provide additional information to the autonomous vehicle such as, for example, additional sensor data or information relayed from a teleoperations device. For example, the second autonomous vehicle may have access to a network connection with a teleoperations device and may relay data between the second autonomous vehicle and the teleoperations device. In some examples, the autonomous vehicle may relay messages via the ad hoc network (e.g., when normal network connectivity is otherwise precluded) regarding the safety of passengers, as well as any other data relevant to safety.

In an additional or alternate example, the autonomous vehicle may gather additional data to corroborate the disaster identification itself. For example, the autonomous vehicle may have generated the disaster identification from a data stream from a first sensor (e.g., IMU data). To corroborate this indication, the autonomous vehicle may identify data from at least a second sensor (e.g., a microphone, a camera) that could be used to corroborate the disaster identification. In some examples, this may include querying passengers of the autonomous vehicle via an input/output interface (e.g., speaker, microphone, display). In an additional or alternate example, the autonomous vehicle may gather additional information from an external source such as a social media feed, a channel of an official authority (e.g., USGS.gov, city emergency channels), a second vehicle, etc.

In some examples, an autonomous vehicle may alter a drive mode of the autonomous vehicle upon obtaining a corroboration of a disaster identification, regardless of how the corroboration is obtained. As used herein, a drive mode may include an entire operation configuration of the vehicle. For example, a default drive mode of the autonomous vehicle may include a default mission of roaming an area of a city until the autonomous vehicle is hailed by a passenger, conforming to spatial and/or legal constraints of operation (e.g., staying within a lane, staying below a speed limit, etc). Some examples of alternations to the drive mode may include, for example, relaxing constraints, actuating an input/output device of the autonomous vehicle (e.g., activating a speaker to warn passengers and/or individuals external to the autonomous vehicle of the disaster, activating additional lights, making a network connection and/or bandwidth available to passengers), and/or conducting an alternate mission.

The alternate mission may depend on the type and/or state of the disaster. For example, the alternate mission may include a route generated before the disaster was detected and generating a new route that includes higher elevation for "early warning" "flood," generating a new route to avoid an area attributed to a disaster for a variety of disaster types, generating a new route destined for an underpass or other protection for "ongoing" "tornado," generating a new route or stopping to avoid buildings for "ongoing" "seismic activity," a shuttle mode that includes returning to a disaster location to pick up and transport individuals from the disaster location to a safe location for a variety of disaster types that are "ongoing" or "post-disaster", etc.

In additional or alternate examples, the autonomous vehicle may alter its drive mode without corroboration from another device. In some examples, the autonomous vehicle may alter its drive mode based on the initial detection of the disaster and/or a corroboration conducted by the autonomous vehicle itself, as discussed above.

In some examples, if a autonomous vehicle receives an indication that the disaster identification was a false positive, a configuration of the autonomous vehicle may be modified to avoid future false positives. For example, a disaster definition stored at or otherwise accessible to the autonomous vehicle may be updated. A teleoperations device may disseminate this update to a fleet of autonomous vehicles.

In some examples, a teleoperations device may transmit to one or more autonomous vehicles of a fleet a notification of the disaster identification and/or a command modifying a drive mode of one or more of the autonomous vehicles. For example, the teleoperations device may transmit a geographical area through which autonomous vehicles may not travel, compelling the autonomous vehicles to generate routes that do not include the geographical area. The teleoperations device may transmit different commands to alter the drive modes of two autonomous vehicles differently. For example, the teleoperations device might transmit a command to all autonomous vehicles of a fleet that do not currently have passengers to operate in "shuttle mode," whereas the teleoperations device might transmit a command to all autonomous vehicles that currently have passenger to operate in "stop at first safe location" mode where the autonomous vehicle does not resume normal operation until an all-clear is received at the vehicle.

Figure 1B:
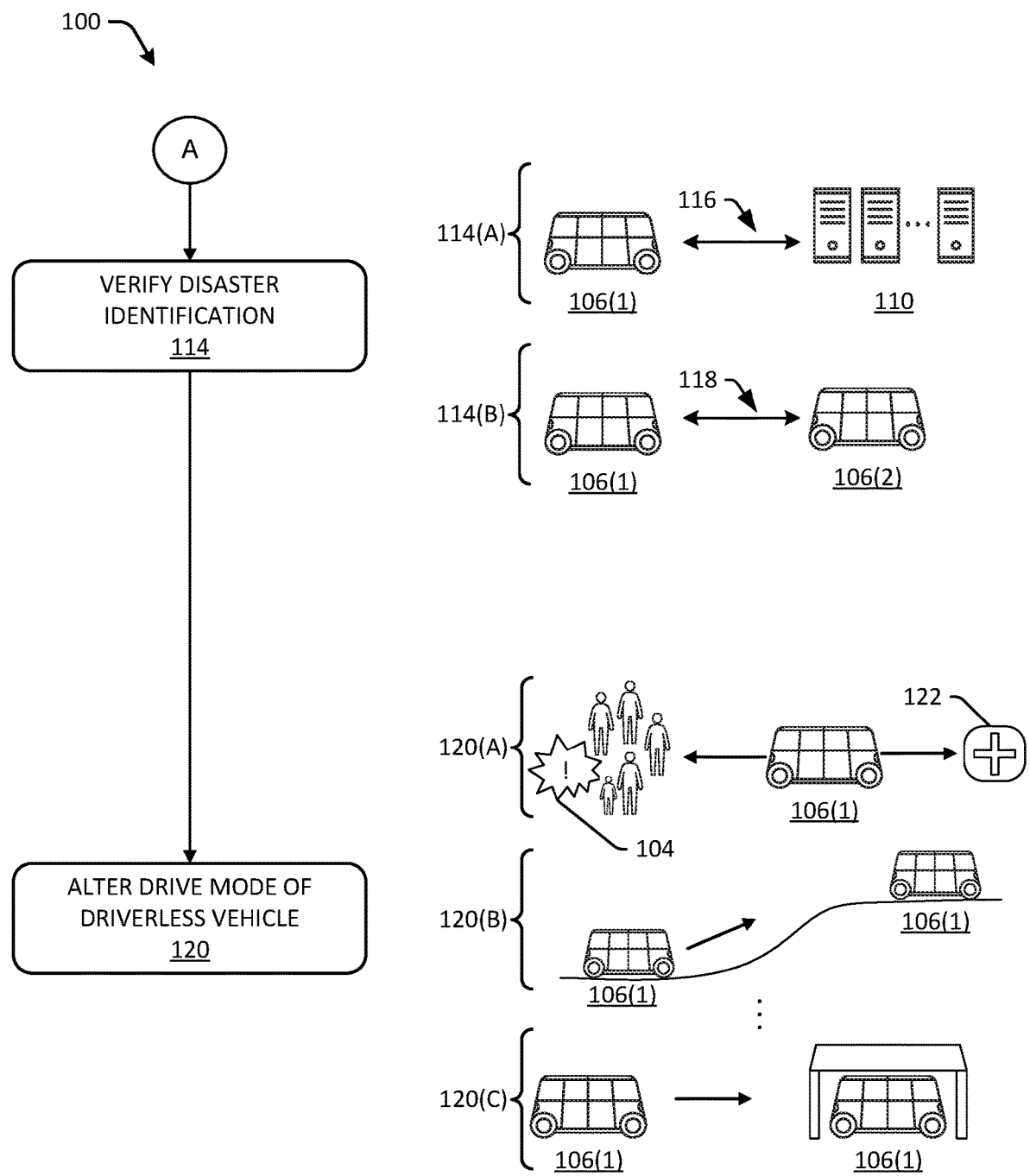

FIGS. 1A and 1B illustrate a pictorial flow diagram of an example process 100 for controlling one or more autonomous vehicles when a disaster has been detected. In FIG. 1A, at operation 102, the example process 100 may include detecting a disaster 104 at a first autonomous vehicle 106(1). In some examples, the first autonomous vehicle 106(1) may detect the disaster 104 from first sensor data 108(1) collected by the first autonomous vehicle 106(1) or otherwise relayed to the first autonomous vehicle 106(1). In additional or alternate examples, the disaster 104 may be detected at a remote computing device 110 and/or a second autonomous vehicle 106(2) and notification thereof may be transmitted to the autonomous vehicle 106.

In some examples, one or more autonomous vehicles 106(1)-106(3) may detect the disaster 104. In some examples, the autonomous vehicles 106(1)-106(3) may corroborate a disaster identification and/or locate a disaster based at least in part on sensor data 108(1)-108(3) received by the autonomous vehicles 106(1)-106(3). For example, where the disaster 104 is seismic activity such as an earthquake, the sensor data 108(1)-108(3) may reflect measurement of shock waves 114 at different times depending on the distance of respective autonomous vehicles from the epicenter of the earthquake. For example, compare the sensor data 108(1) of the first autonomous vehicle 106(1) that is closer to the disaster 104 (i.e., epicenter of an earthquake in this example), to the sensor data 108(2) of the second autonomous vehicle 106(2) where the first shock waves have just reached the second autonomous vehicle 106(2) and the sensor data 108(3) of the third autonomous vehicle 106(3) where the first shock waves have not yet reached the third autonomous vehicle 106(3). In some examples, the sensor data 108(1)-108(3) may be used to corroborate the existence of a disaster and/or to determine characteristics of the disaster (e.g., a measure of magnitude, directionality, location, velocity, acceleration, viscosity).

In some examples, one or more processors of a autonomous vehicle may be configured to generate a disaster identification from sensor data. In some examples, the sensor data may include lidar signals, camera signals (e.g., infrared (IR), red/green/blue (RGB), depth, stereo, greyscale), radar signals, microphone signals, sonar signals, IMU signals, global positioning system (GPS) signals, Geiger counter signals, or drive system sensor (e.g., a sensor that monitors activity of a component of the drive system such as, for example, compression of the suspension system, tire slip, fuel/energy level, engine performance data, steering inputs, tire pressure, vehicle weight, etc.) signals, external environment sensors (e.g., sensors to detect temperature, pressure, humidity, wind, sun, time of day, season, traffic, etc.), etc. The operation 102 may include receiving data from any number of vehicles to generate aggregated data which can be analyzed to determine whether or not to generate a disaster identification and/or to generate a disaster identification.

In some examples, the disaster identification may include data characteristics to which the first autonomous vehicle 106(1) may compare received sensor data, a disaster state, and/or a disaster type. For example, a disaster state may include indication of an "early warning" or "pre-disaster" condition that is indicative of a disaster. This may include dry vegetation conditions that may increase the likelihood of a wildfire, elevated rain and/or water levels, wind speeds, audio that indicates a potential disaster (e.g., rumbling, crowd noise), etc. A disaster state may additionally or alternatively include an indication of an ongoing disaster and/or that a disaster has already occurred but disaster conditions persist (e.g., flooding/landslide, destroyed roadways, obstructions). The disaster type may include, for example, cyclone, flood, seismic activity (e.g., earthquake, volcano, sinkhole, tsunami), fire, projectile collision (e.g., meteor, massive collision such as a fallen aircraft or missile), elevated radiation levels, aberrant human activity, an explosion, etc.

In FIG. 1B, at operation 114, the example process 100 may continue and include verifying a disaster identification. In some examples, as discussed above, the first autonomous vehicle 106(1), a second autonomous vehicle 106(2), and/or a remote computing device 110 may detect the disaster and generate a disaster identification. In additional or alterative examples, such a disaster identification may be determined based on aggregated sensor data from multiple sources, including multiple autonomous vehicles 106. In a first example 114(A), the first autonomous vehicle 106(1) may generate a disaster identification and transmit the disaster identification to a remote computing device 110 via a first network 116. In a second example 114(B), the first autonomous vehicle 106(1) may generate a disaster identification and transmit the disaster identification to a second autonomous vehicle 106(2) via a second network 118. In some examples, the first network 116 and the second network 118 may be the same network. In some examples, the second network 118 may be established when the first network 116 is degraded or unavailable. In some examples, the second autonomous vehicle 106(2) may relay data between the first autonomous vehicle 106(1) and the remote computing device 110 via a network established between the second autonomous vehicle 106(2) and the remote computing device 110. The second network 118 may include an ad hoc network connection and, in some examples, that ad hoc connection between the first autonomous vehicle 106(1) and the second autonomous vehicle 106(2) may be one ad hoc connection of a plurality of ad hoc networks that, as a whole, form a mesh network between a fleet of autonomous vehicles or other nodes that facilitate the mesh network. In some examples, data regarding the mesh network and/or connectivity of the network 116 between a remote computing device 110 and individual ones of a plurality of autonomous vehicles may be used to corroborate the disaster identification.

In some examples, the autonomous vehicle 106(1) may relay messages via the second network 118 (e.g., when normal network connectivity is otherwise precluded) to another device (e.g., another autonomous vehicle, the remote computing device 110, law enforcement device, medical responder device, emergency contact device) regarding the safety of passengers, as well as any other data relevant to safety. In some examples, the autonomous vehicle 106(1) may relay a message via the second network 118 regarding the safety of a passenger to a device associated with a contact stored at a device of a passenger. In some examples, the autonomous vehicle 106(1) may relay a message via the second network 118 to remote computing device 110 to notify the remote computing device 110 that the passengers of autonomous vehicle 106(1) are safe, that a passenger of the autonomous vehicle 106(1) needs medical attention, and/or that the autonomous vehicle 106(1) is re-routing to seek medical attention for a passenger.

In some examples according to operation 114(A), the remote computing device 110 may include one or more devices and/or a distributed cloud computing system. In some examples, the remote computing device 110 may include a teleoperations device.

The teleoperations device may be a device configured to respond to disaster identifications (e.g., a device that is configured with more extensive machine learning, has access to greater amounts of data, and/or has greater processing abilities or bandwidth, etc.). Such a teleoperations device may also rely on additional data available (alerts from the National Weather Service, alerts from law enforcement, etc). In additional or alternate examples, the teleoperations device may display information related to the disaster identification and/or other information that may be useful for corroborating the disaster identification (e.g., sensor data from one or more autonomous vehicles; regional data such as, for example, weather data, governmental entity data, etc.) to a remote operator ("teleoperator") and may include an interface for receiving input, such as an indication that the disaster identification is a true positive or a false positive, from the teleoperator. A teleoperations device may include, for example, a device configured to receive teleoperator input. Teleoperators may be humans located at a teleoperations center and/or one or more of the teleoperators may not be human, such as, for example, they may be computer systems leveraging artificial intelligence, machine learning, and/or other decision making strategies. In some examples, a teleoperator may interact with one or more vehicles in a fleet of vehicles via an interface of the teleoperations device. The teleoperator interface may include one or more displays configured to provide the teleoperator with data related to operation of a vehicle, a subset of the fleet of vehicles, and/or the fleet of vehicles. For example, the display(s) may be configured to show data related to sensor signals received from the vehicles, data related to a road network, and/or additional data or information to facilitate providing assistance to the vehicles.

Additionally, or alternatively, the teleoperator interface may also include a teleoperator input device configured to allow the teleoperator to provide information to one or more of the vehicles, for example, in the form of teleoperation signals providing guidance to the vehicles. The teleoperator input device may include one or more of a touch-sensitive screen, a stylus, a mouse, a dial, a keypad, a microphone, a touchscreen, and/or a gesture-input system configured to translate gestures performed by the teleoperator into input commands for the teleoperator interface. As explained in more detail herein, the teleoperations system may provide one or more of the vehicles with guidance to avoid, maneuver around, or pass through events at the vehicle. Additionally or alternatively, the teleoperator interface can include other input/output device(s) such as, for example, a microphone, a speaker, and/or a haptic feedback device In some examples, the remote computing device 110 may transmit an indication to the autonomous vehicle and/or additional autonomous vehicles of a corroboration (e.g., verification) of the disaster identification (i.e., identifying the disaster identification as a true positive) or identifying the disaster identification as a false positive. For example, this may be based on teleoperator input or a machine-learned algorithm outcome at the remote computing device 110. In some examples, the remote computing device 110 may also provide a command to alter a drive mode of one or more autonomous vehicles, based at least in part on corroborating the disaster identification.

In some examples, the first autonomous vehicle 106(1) may transmit an advanced warning of an "early warning" or an "ongoing" state, for example, to a remote computing device 110. In some examples, the remote computing device 110 may use this information (and similar information from other autonomous vehicles and/or other sources) to identify a leading edge of an earthquake, direction of lava flow, direction of aberrant human movement, etc. In some examples, the teleoperations device may provide commands to one or more autonomous vehicles based on this inference. For example, the remote computing device 110 may transmit a command to a fleet of autonomous vehicles to avoid an area that includes both a current location of a disaster and/or the first autonomous vehicle and an area that the teleoperations device and/or a teleoperator interpolates, extrapolates, or estimates as being a direction in which conditions of the disaster will be within a time range. In one example, the remote computing device 110 might command the fleet of autonomous vehicles to avoid both an area where a riot is occurring and, based on perception data received from one or more autonomous vehicles regarding the velocity and/or acceleration of identified objects at the riot area (e.g., people), an area to which the riot is anticipated to move within 30 minutes (or any other time period, for example).

In some examples, the remote computing device 110 may transmit different commands to different vehicles based on vehicle occupation, vehicle location, relative vehicle distance from the disaster, vehicle state (e.g., vehicle health, vehicle range, vehicle equipment), network state, etc. In some examples, the remote computing device 110 may command a autonomous vehicle to relay a corroboration of a disaster identification and/or a command to one or more other autonomous vehicles (e.g., if a primary network is degraded). In some examples, the remote computing device 110 may determine which autonomous vehicles to transmit a corroboration and/or command to based at least in part on a disaster state and/or type. For example, the remote computing device 110 may determine to send a corroboration to the first autonomous vehicle 106(1) for an "early-warning" "wildfire," but may not send the corroboration and/or any command to any other autonomous vehicles. Whereas, for an "early-warning" "flood" corroboration, the remote computing device 110 may determine to transmit the corroboration and/or a command to all autonomous vehicles in an area identified as potentially being affected by the potential flood.

In an additional or alternate example, the remote computing device 110 may include a computing device associated with a passenger (e.g., a smartphone of a passenger). In such an example, the passenger device may be configured to display an interface for indications to be made by a passengers (e.g., a corroboration and/or a false positive identifier, further information to be relayed to a teleoperations device) and/or to inform the passenger of a disaster condition. As a non-limiting example, the passenger may be asked, via a smartphone, to confirm whether or not there is a fire ongoing in proximity of the vehicle 106 carrying the passenger.

In an additional or alternate example according to operation 114(B), the first autonomous vehicle 106(1) may transmit the disaster identification to a second autonomous vehicle 106(2). In response to receiving the disaster identification from the first autonomous vehicle 106(1), the second autonomous vehicle 106(2) may respond with a second disaster identification that the second autonomous vehicle 106(2) has generated, if one was generated, or an indication that no such indication has been generated. In some examples, the second autonomous vehicle 106(2) may also provide additional information to the first autonomous vehicle 106(1) such as, for example, additional sensor data or information relayed from a teleoperations device. For example, the second autonomous vehicle 106(2) may have access to a network connection with a teleoperations device and may relay data between the first autonomous vehicle 106(1) and the teleoperations device.

In some examples, the first autonomous vehicle 106(1) may transmit the disaster identification to other autonomous vehicles within range of an ad hoc network connection of the first autonomous vehicle 106(1). These other autonomous vehicles may, in turn, repeat the disaster identification to other autonomous vehicles so that the disaster identification is dispersed by decentralized dissemination. This may additionally or alternately include a command and/or alternate drive mode.

In some examples, the remote computing device 110 and/or the first autonomous vehicle 106(1) may transmit the disaster identification and/or data interpolated from one or more disaster identifications (e.g., a leading edge or other characteristics of an earthquake, a fire location) to devices of entities that may be affected by the disaster (e.g., a channel of a city adjacent to a city in which an earthquake is detected, device of an entity controlling gas lines or transportation).

At operation 120, the example process 100 may include altering a drive mode of a autonomous vehicle, based at least in part verifying a disaster identification 114. For example, regardless of where a corroboration came from (e.g., a remote computing device 110 and/or a second autonomous vehicle 106(2)), the first autonomous vehicle 106(1) may alter its drive mode. In some examples, this may be accomplished based at least in part on a received command and/or an alternate mission associated with the disaster type and/or disaster state. For example, the first autonomous vehicle 106(1) may receive an alternate drive mode determined by a second system (e.g. a teleoperator, teleoperations device, or second vehicle 106(2)) in addition to the corroboration. In some examples, the first autonomous vehicle 106(1) may determine and initiate an alternate drive mode based solely on receiving the corroboration. For example, upon receiving a corroboration of "ongoing" "flood," the first autonomous vehicle 106(1) may alter its drive mode from a nominal drive mode (e.g., roam until hailed by a passenger, generate route to passenger's destination, drop-off passenger, return to roaming) to a "seek high ground" mode.

In some examples, alternate drive modes may include, for example:
- a "shuttle mode" 120(A) where the first autonomous vehicle 106(1) drops off any current passengers at a safe location 122, and iteratively travels towards or to a disaster 104 location and returns to the safe location 122 once the first autonomous vehicle 106(1) has acquired at least one passenger;
- "seek high ground" mode 120(B) where the first autonomous vehicle 106(1) generates a route that includes or terminates at a geographical location that is at a higher elevation than a current elevation of the first autonomous vehicle 106(1);
- "seek shelter" mode 120(C) where the first autonomous vehicle 106(1) determines a geographical location on a map accessible to the first autonomous vehicle 106(1) that includes shelter from weather and/or debris (e.g., an overpass to shelter the vehicle and passengers from a tornado, a safe location) and generates a route to the geographical location;
- geographical area avoidance (e.g., generating routes to guide the autonomous vehicle that do not include the geographical area);
- a "safe stop" mode where the first autonomous vehicle 106(1) comes to a stop in a safe place (e.g., away from buildings, at high ground, off the roadway, under shelter) a until an all-clear signal is received;
- a "preferential travel" mode where the first autonomous vehicle 106(1) defers to movement of another vehicle (e.g., emergency vehicles, another autonomous vehicle with an injured passenger) and/or prioritizes its own movement (e.g., by relaxing constraints on the most expedient mode of travel, such as speed, driving envelope, etc.);
- a "vehicle coordination" mode where one or more autonomous vehicles coordinate their positioning and/or trajectories with other vehicles (e.g., positioning vehicles to maximize a number of vehicles that may be parked under an overpass or on top of a hill);
- a "bulldozer" mode where the first autonomous vehicle 106(1) pushes and/or pulls other objects; or
- a "medical" mode where the first autonomous vehicle 106(1) prioritizes and/or includes a route that includes a medical services location, etc.

In some examples, the first autonomous vehicle 106(1) may receive additional sensor data regarding passenger conditions to determine an alternate drive mode such as, for example, a medical mode. In some examples, the drive modes may be combined. In some examples, the altered drive mode may depend, at least in part, on a disaster type and/or disaster state. For example, the following drive modes may be associated with the following disaster types and disaster states:

| EXAMPLE DISASTER STATE/DISASTER TYPE | EXAMPLE DRIVE MODE |
|---|---|
| Ongoing seismic activity (earthquake) | Safe stop mode |
| Post-disaster (any disaster type) | Shuttle mode, bulldozer mode, medical |
| Early warning flood or seismic activity (tsunami) | Seek high ground mode, preferential travel mode, shuttle mode, geographical area avoid |
| Ongoing flood | Seek high ground mode, geographical area avoidance |
| Ongoing fire | Geographical area avoidance |

In some examples, the first autonomous vehicle 106(1) may come to a safe stop until it receives a corroboration of the disaster identification or an identification of the disaster identification as a false positive. The first autonomous vehicle 106(1) may substantially simultaneously come to a safe stop and transmit the disaster identification to the remote computing device 110 and/or the second autonomous vehicle 106(2) or otherwise seek to corroborate the disaster identification. Upon receiving an indication that the disaster identification was a false positive, the first autonomous vehicle 106(1) may be released from the safe stop and it may resume a nominal driving mode. In some examples, the first autonomous vehicle 106(1) may be configured to initiate a default alternate mission for the disaster type and/or disaster state upon receiving a corroboration without the need to receive instructions to initiate the default alternate mission for that disaster type and/or disaster state.

In an additional or alternate example, if the first autonomous vehicle 106(1) receives an indication of a false positive, the first autonomous vehicle 106(1) may return to a nominal driving mode. In some examples, the first autonomous vehicle 106(1) and/or the remote computing device 110 may update a disaster definition that corresponds with the disaster identification so that the disaster definition is refined to prevent repetitious false positives. The first autonomous vehicle 106(1) and/or the remote computing device 110 may transmit the updated disaster definition to one or more other autonomous vehicles.

Figure 2:
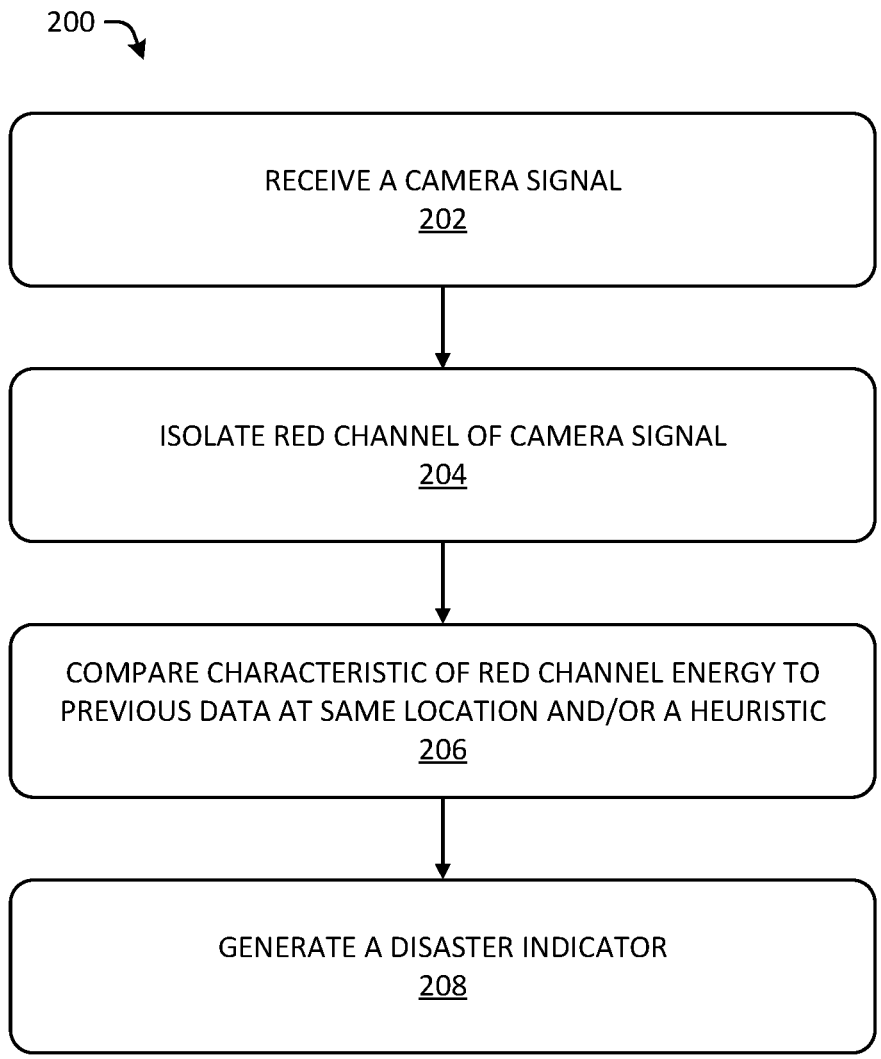
FIG. 2 illustrates a flow diagram of an example process for generating a disaster identification based at least in part on a camera signal.

FIG. 2 illustrates a flow diagram of an example process 200 for generating a disaster identification based at least in part on a camera signal. Example process 200 includes measuring the reflectance of vegetation in the photosynthetically active radiation (PAR) band (i.e., the wave band of solar radiation from 400 to 700 nanometers that photosynthetic organisms use in photosynthesis). Chlorophyll, the primary pigment in photosynthesis, absorbs near-infrared and red light, whereas accessory pigments such as carotenes and xanthophylls collect green light. Measuring the red edge reflectance of vegetation in the PAR spectrum (referred to herein as the "red channel") may provide an indication of plant activity, such as whether the vegetation is dry, healthy, ready-for-harvest, etc. These vegetation conditions (e.g., dry, healthy, read-for-harvest) may be included in a disaster identification such as "early warning" "wildfire," "crops ready-for-harvest," "low wildfire likelihood," etc.

At operation 202, the example process 200 may include receiving a camera signal. For example, the first autonomous vehicle 106(1) may receive an RGB and/or infrared signal from a camera of the first autonomous vehicle 106(1).

At operation 204, the example process 200 may include isolating a channel of the camera signal. In some examples, a perception engine of the first autonomous vehicle 106(1) may determine that the camera signal includes a depiction of vegetation using image recognition and may isolate analysis of the signal to a portion of the signal corresponding to a vegetation. In additional or alternate examples, to avoid false positives, the first autonomous vehicle 106(1) may rule out the existence of interfering objects in the camera signal that are not vegetation, such as, a car or a billboard.

In some examples, the first autonomous vehicle 106(1) may be configured to spectrally filter the camera signal to isolate the red channel (i.e., PAR band) of the signal (e.g., by filtering the camera signal). In some examples, the first autonomous vehicle 106(1) may be configured to spectrally filter or otherwise identify another channel such as, for example and without limitation, an infrared band.

At operation 206, the first autonomous vehicle 106(1) may determine a characteristic of the energy currently present in the channel (e.g., the photosynthetic photon flux, yield photon flux, normalized difference vegetation index). In some examples, the first autonomous vehicle 106(1) may compare that characteristic to historical channel information and/or a heuristic. Where historical channel information is used, one or more autonomous vehicles may capture and record the characteristic and a location and/or vehicle pose (e.g., pitch, yaw, heading) at which the characteristic was captured. This data may be locally stored at the first autonomous vehicle 106(1) and/or streamed to the first autonomous vehicle 106(1) from a remote computing device 110, as the autonomous vehicle arrives at the location at which the data was captured (e.g., by relaying a location of the autonomous vehicle to the remote computing device and receiving the historical channel data in response). In some examples, the first autonomous vehicle 106(1) may normalize a value of the current channel energy based on differences between current and historical weather, location, pose, etc.

In some examples, the first autonomous vehicle 106(1) may determine that the energy of the channel of a current camera signal is higher than a historical energy of the channel of a previous camera signal at the same location. In some examples, the one or more processors may generate a disaster identification based at least in part on determining that the current channel energy is greater than the historical channel energy by a defined threshold.

In an example implementing a heuristic, the first autonomous vehicle 106(1) may generate a disaster identification by comparing the current channel energy to a scalar value that is determined based on a portion of the camera signal that is attributable to vegetation and/or a geographical region, since flora varies regionally (e.g., pine trees will result in higher energy in the channel than ferns, even when both are equally healthy, for example).

The threshold difference between current and historic channel energy, the heuristic, and/or previously recorded channel energy are examples of components of a disaster definition that can be stored at the autonomous vehicle, streamed to the autonomous vehicle, and/or stored at a remote computing device 110 (e.g., where the technique described above is conducted at the remote computing device by transmitting the sensor data to the remote computing device).

At operation 208, the example process 200 may include generating a disaster identification by the first autonomous vehicle 106(1) based at least in part on comparing current channel energy to previously recorded channel energy and/or a heuristic. In some examples, if the comparison indicates that the channel energy is not indicative of a disaster condition and/or a crop readiness condition, then no disaster identification is generated. Where the comparison reveals that one of these exists, the disaster identification may include a disaster state and disaster type such as "ongoing" "fire," if the channel energy is high enough to indicate that a fire is occurring or "early warning" "fire," if the channel energy is not high enough to indicate that a fire is occurring, but that the vegetation is dry.

In an example implementing a heuristic, the first autonomous vehicle 106(1) may generate a disaster identification by determining that a color ratio meets a threshold. For example, the first autonomous vehicle 106(1) may determine that a red-to-green energy ratio (i.e., the ratio of red energy present in the channel to green energy present in the channel) and/or a red-to-blue energy ratio (i.e., the ratio of red energy present in the channel to blue energy present in the channel) meets a threshold that indicates "early warning" "fire."

Based on the type of flora present, the first autonomous vehicle 106(1) may also generate an indication that vegetation is ready to be harvested, based on the channel energy. In some examples, the first autonomous vehicle 106(1) may transmit an indication that vegetation is ready to be harvested and/or a disaster identification to a remote computing device 110. In some examples, the remote computing device may include a third-party device, such as a governmental agency (e.g., wildfire agency, county alert system, fire department) or a device associated with a farmer.

In some examples, the first autonomous vehicle 106(1) may corroborate the disaster identification by acquiring further sensor data, transmitting the disaster identification to a remote computing device 110, and/or transmitting the disaster identification to a second autonomous vehicle 106(2), etc. For example, the first autonomous vehicle 106(1) may receive an infrared camera signal and/or a microphone signal in an attempt to corroborate a disaster notification, "ongoing" "fire" to detect a thermal signal that corresponds with a fire and/or the sound of fire, respectively.

In some examples, one or more autonomous vehicles may generate disaster identifications and/or contribute collected sensor information to increase confidence that a disaster condition has been detected. In some examples, this may include receiving sensor data from one or more autonomous vehicles and defining characteristics of the disaster such as, for example, a location, dimension, velocity, acceleration, etc. of the disaster (e.g., a boundary of a fire, a speed of a mudslide or fire expansion). In some examples, the remote computing device 110 may use these characteristics to generate a zone and/or boundary of the disaster and/or a zone and/or boundary through which the autonomous vehicles will not generate a route. In some examples, the remote computing device 110 may generate a map with an indications of conditions associated with received disaster indications.

Figure 3:
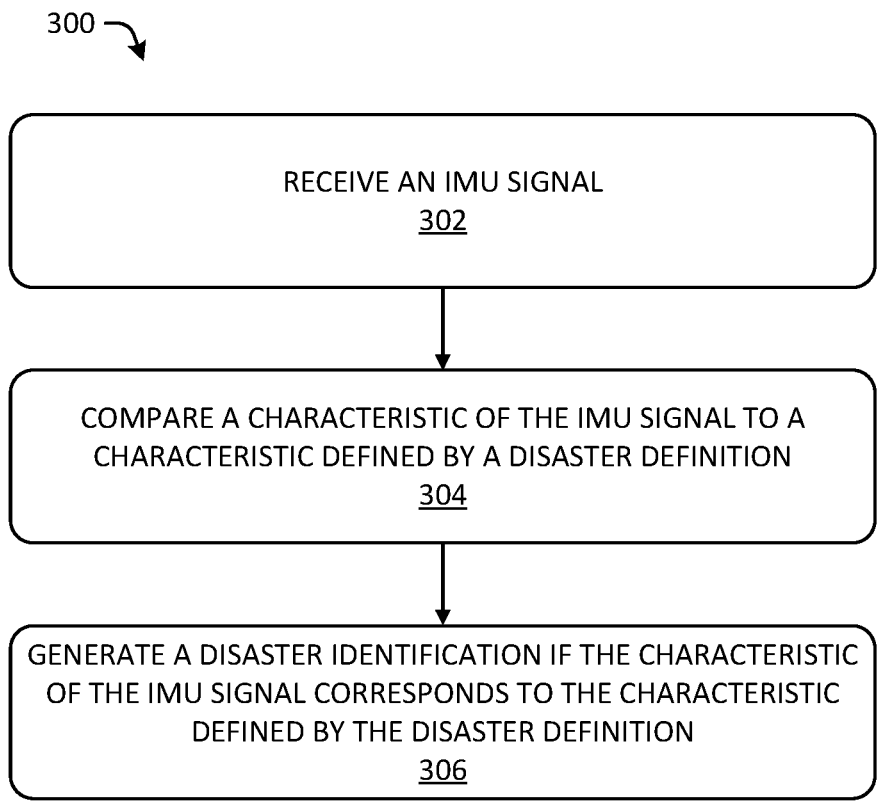
FIG. 3 illustrates an example process for generating a disaster identification based at least in part on inertial measurement unit measurements.

FIG. 3 depicts an example process 300 for generating a disaster identification based at least in part on IMU measurements. The first autonomous vehicle 106(1) may be configured to detect seismic activity, from the IMU measurements, for example.

At operation 302, the first autonomous vehicle 106(1) may receive an IMU signal from an IMU of the first autonomous vehicle 106(1). In additional or alternate examples, the first autonomous vehicle 106(1) may receive the IMU signal from a remote computing device 110 and/or a second autonomous vehicle 106(2).

At operation 304, the first autonomous vehicle 106(1) may compare a characteristic of the IMU signal to a disaster definition that may be indicative of a disaster condition such as, for example, a tremor and/or volcanic eruption. In some examples, the first autonomous vehicle 106(1) may periodically or continuously conduct a comparison of a characteristic of the IMU signal such as, for example, a velocity and/or an acceleration in a roll, yaw, pitch, and/or heading direction. In some examples, the first autonomous vehicle 106(1) may transform at least a portion of the IMU signal before comparing the IMU signal to the disaster definition. For example, the first autonomous vehicle 106(1) may conduct a Fourier transform of at least a portion of the IMU signal to determine a spectral profile (e.g., frequency and/or magnitude of the IMU signal) which the first autonomous vehicle 106(1) may compare to one or more spectral profiles stored in one or more disaster definitions.

In some examples, a disaster definition associated with seismic activity may include a threshold magnitude (e.g., +/−5°/s angular velocity about any axis, +/−1 m/s$^2$ change in acceleration along any axes, etc.), a duration (e.g., 10 ms, 50 ms, 3 seconds, 5 seconds), and/or spectral profile. The first autonomous vehicle 106(1) may compare a current IMU signal to one or more of the portions of that disaster definition. This comparison may include determining a match score, a fit, and/or some other indicia of similarity between the current IMU signal to one or more portions of the disaster definition. In some examples, such a score or fit may be determined for other sensor signals and disaster definitions. In some examples, a disaster definition for seismic activity may include multiple spectral profiles since earthquakes typically exhibit energy across a band of frequencies between 0.1 and 1-2 Hz, sometimes between 0.1 and 10 Hz, and rarely over 20 Hz.

In some examples, the first autonomous vehicle 106(1) may alternately or additionally initially identify, corroborate, or negate a disaster identification of seismic activity using a camera signal (e.g., to identify source of shaking, to identify volcanic ash in the air using reflectance, to identify volcanic projectiles, to identify a false positive with a collision), a network connection (e.g., to retrieve seismic data from a remote computing device), a drive system sensor (e.g., a suspension system sensor that transmits data regarding shock absorber compression), etc.

At operation 306, if the first autonomous vehicle 106(1) determines that a current IMU signal includes a characteristic that meets the disaster definition (e.g., by meeting or meeting a threshold magnitude and/or duration, and/or by exemplifying a spectral profile that fits a spectral profile of the disaster definition), then then first autonomous vehicle 106(1) may generate a disaster identification. In some examples, other sensor data may be used to refine a type of seismic activity from general seismic activity to more particular seismic activity such as, for example, volcanic activity (e.g., by a network connection, a camera signal), a sinkhole (e.g., by a camera signal, a lidar signal), earthquake (e.g., by a network connection, a camera signal, a lidar signal). In some examples, IMU data from other autonomous vehicles 106 may be combined with their various locations for determining the disaster, as well as categorizing the disaster (e.g. similar data from vehicles 106 in a fleet may indicate the presence of a wave front of propagation of seismic activity).

In some examples, multiple autonomous vehicles may transmit sensor data therebetween and/or to a remote computing device 110. In some examples, sensor data from an individual autonomous vehicle may include a global time, a location and/or pose of the autonomous vehicle, IMU data measured by the autonomous vehicle, etc. A remote computing device 110 and/or an autonomous vehicle to which this data is relayed may use the data to determine a confidence that the sensor data corroborates that an earthquake has occurred/is occurring. In some examples, the remote computing device 110 and/or autonomous vehicle may determine attributes of the earthquake such as, for example, a magnitude of the earthquake, an epicenter of the earthquake, a shock wave type and/or speed, etc.

Figure 4:
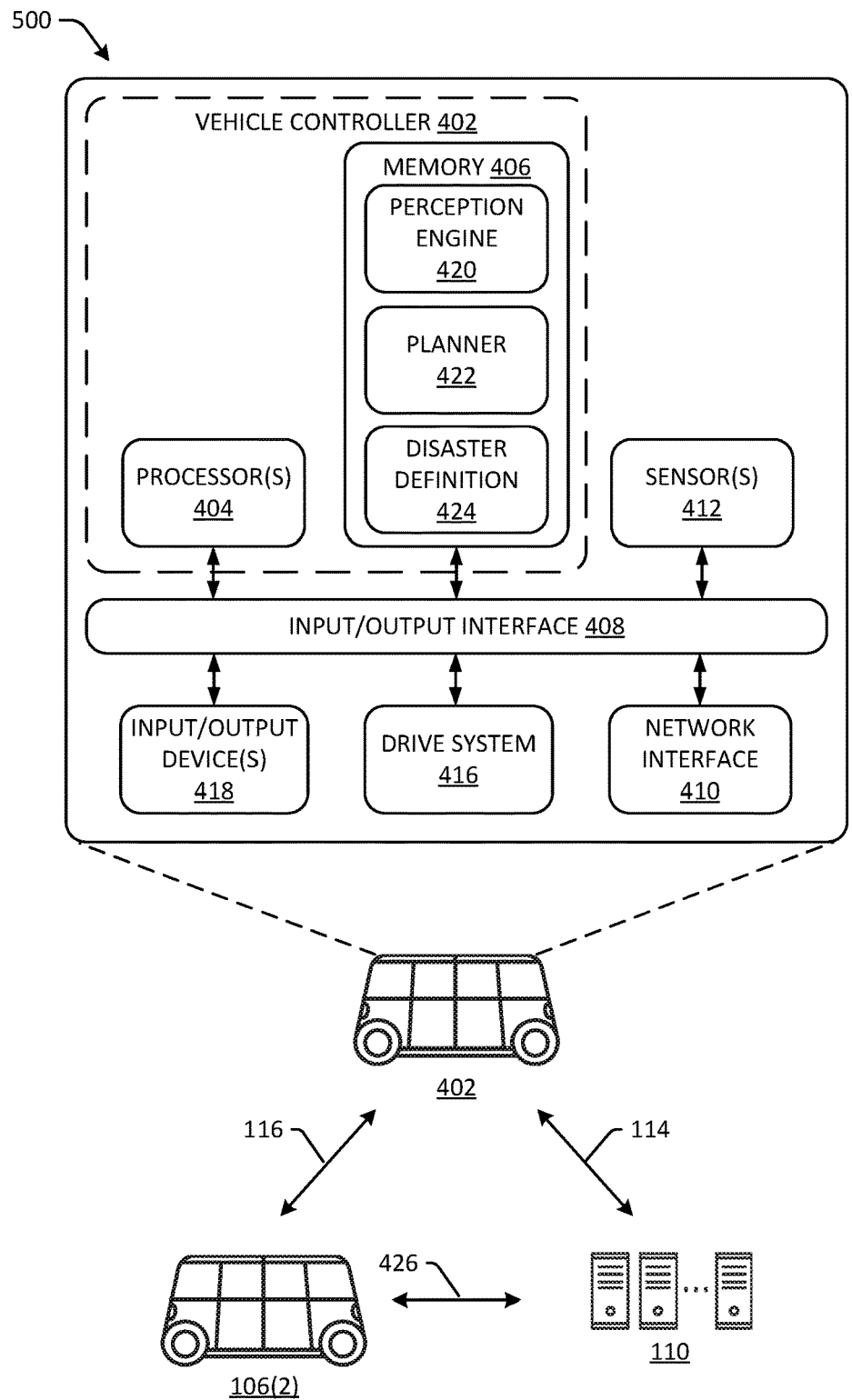
FIG. 4 illustrates a block diagram of an example architecture, including a vehicle system, for controlling operation of at least one autonomous vehicles when a disaster is detected.

FIG. 4 is a block diagram of an example architecture 400 including an example vehicle system 402 for controlling operation of at least one autonomous vehicle when a disaster is detected. In some examples, this architecture may be used to control a fleet of vehicles when a disaster is detected.

In some examples, the vehicle system 402 may represent at least a portion of the first autonomous vehicle 106(1) and/or the second autonomous vehicle 106(2). In some examples, the vehicle system 402 may include processor(s) 404 that may include a uniprocessor system including one processor, or a multiprocessor system including several processors (e.g., two, four, eight, or another suitable number). The processor(s) 404 may be any suitable processor capable of executing instructions. For example, in various implementations, the processor(s) may be general-purpose or embedded processors implementing any of a variety of instruction set architectures (ISAs), such as the x86, PowerPC, SPARC, or MIPS ISAs, or any other suitable ISA. In multiprocessor systems, each processor may commonly, but not necessarily, implement the same ISA. In some examples, the processor(s) 404 may include a central processing unit (CPU), a graphics processing unit (GPU), or a combination thereof.

The example vehicle system 402 may include memory 406. In some examples, the memory 406 includes a non-transitory computer readable media configured to store executable instructions/modules, data, and/or data items accessible by the processor(s) 404. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 402 via an input/output ("I/O") interface 408. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via a network interface 410.

In some examples, the I/O interface 408 may be configured to coordinate I/O traffic between the processor(s) 404, the non-transitory computer readable media 406, and the network interface 410, sensor(s) 412, drive system 416, and/or peripheral devices such as, for example I/O devices 418. In some examples, the I/O devices 418 may include external and/or internal speaker(s), display(s), passenger input device(s), etc. In some examples, the I/O interface 408 may perform any necessary protocol, timing, or other data transformations to convert data signals from one component (e.g., the non-transitory computer readable media) into a format suitable for use by another component (e.g., processor(s)). In some examples, the I/O interface 408 may include support for devices attached through various types of peripheral buses, such as a variant of the Peripheral Component Interconnect (PCI) bus standard or the Universal Serial Bus (USB) standard, for example. In some implementations, the function of the I/O interface 408 may be split into two or more separate components, such as a north bridge and a south bridge, for example. Also, in some examples, some or all of the functionality of the I/O interface 408, such as an interface to the non-transitory computer readable media, may be incorporated directly into the processor(s) 404.

The example vehicle system 402 includes sensor(s) 412, for example, configured to sense movement of the example vehicle system 402 through its environment, sense environmental data (e.g., ambient temperature, pressure, and humidity), and/or sense conditions of an interior of the example vehicle system 402 (e.g., passenger count, interior temperature, noise level). In some examples, the sensor(s) 412 may include sensor to detect disaster conditions. The sensor(s) 412 may include, for example, one or more lidar sensors one or more cameras (e.g. RGB-cameras, intensity (grey scale) cameras, infrared cameras, depth cameras, stereo cameras), one or more magnetometers, one or more radio detection and ranging sensors (RADAR), sound navigation and ranging (SONAR) sensors, one or more microphones for sensing sounds, one or more IMU sensors (e.g., including accelerometers and gyroscopes), one or more GPS sensors, one or more Geiger counter sensors, one or more drive system sensors, and/or other sensors related to the operation of the example vehicle system 402. Other sensors may include, for example, a speed sensor, sensors related to operation of internal combustion engines and/or electric motors, sensors related to the tires to detect tire temperature, tire pressure, and tread depth, and/or brake-related sensors for detecting brake temperatures and/or wear, and in vehicles having regenerative braking, sensors for detecting parameters related to operation of the regenerative braking system.

The sensors 412 may be configured to provide sensor data representative of the sensed objects and signals to the processor(s) 404 via, for example, the I/O interface 408. Other types of sensors and sensor data are contemplated.

The example vehicle system 402 may also include one or more of a perception engine 420, a planner 422, and a disaster definition 424.

The perception engine 420 may include instructions stored on memory 406 that, when executed by the processor(s) 404, configure the processor(s) 404 to receive sensor data from the sensor(s) 412 as input, and output data representative of, for example, one or more of the pose (e.g. position and orientation) of an object in the environment surrounding the example vehicle system 402, an object track associated with the object (e.g., a historic position, velocity, acceleration, and/or heading of the object over a period of time (e.g. 5 seconds)), and/or an object classification associated with the object (e.g. a pedestrian, a vehicle, a bicyclist, etc.). In some examples, perception engine 420 may be configured to predict more than an object trajectory of one or more objects. For example, the perception engine 420 may be configured to predict multiple object trajectories based on, for example, probabilistic determinations or multi-modal distributions of predicted positions, trajectories, and/or velocities associated with an object.

The planner 422 may include instructions stored on memory 406 that, when executed by the processor(s) 404, configure the processor(s) 404 to generate data representative of a trajectory of the example vehicle system 402, for example, using data representing a location of the example vehicle system 402 in its environment and other data, such as local pose data. In some examples, the planner 422 may also be configured to determine projected trajectories predicted to be executed by the example vehicle system 402. In some examples, the planner 422 may substantially continuously (e.g., every 1 or 2 milliseconds) generate a plurality of potential trajectories with which to control the example vehicle 402 and select one of the trajectories with which to control the vehicle. The selection may be based at least in part on a current route, a drive mode (e.g., which may be altered by a disaster identification, in some examples), current vehicle trajectory and/or object trajectory data. Upon selecting a trajectory, the planner 422 may transmit the trajectory to the drive system 416 to control the example vehicle system 402 according to the selected trajectory.

In some examples, the memory 406 may include at least one disaster definition 424 and/or the disaster definition 424 may otherwise be accessible to the vehicle (e.g., by communicating with a remote computing device), as described in more detail above. In an additional or alternate example, the disaster definition 424 may be received at the example vehicle system 402 via the network interface 410. In some examples, the perception engine 420 further includes instructions stored on memory 406 that, when executed by the processor(s) 404, configure the processor(s) 404 to determine whether received sensor data corresponds to a disaster definition 424. If the perception engine 420 determines that the sensor data corresponds to a disaster definition 424, the perception engine 420 may generate a disaster identification, as discussed above. The perception engine 420 may transmit the disaster identification via the network interface 410 to a remote computing device 110 via a network 116 and/or a second autonomous vehicle 106(2) via a network 118. As discussed above, the remote computing system 110 may include a teleoperations device, a passenger device, or another third-party device such as, for example, a disaster verification channel (e.g., government channel, research channel), an agricultural device, and/or a disaster notification channel (e.g., a city channel, a government channel, police channel, military channel, medical channel). In some examples, the second autonomous vehicle 106(2) may communicate with the remote computing system 110 via a network 426. The second autonomous vehicle 106(2) may relay messages between the example vehicle system 402 and the remote computing system 110.

In some examples, the perception engine 420, the planner 422, and/or the disaster definition 424 may include software and/or hardware. For example, in addition to the instructions composing the perception engine 420, the perception engine 420 may further include specialized hardware such as, for example, a processor that is suited to running the perception engine (e.g., a graphics processor, an FPGA).

In some examples, a corroboration of a disaster identification and/or an indication of a false positive may be received via the network interface 410. In some examples, updates to one or more of the perception engine 420, the planner 422, and/or the disaster definition 424, may be received via the network interface 410.

Figure 5:
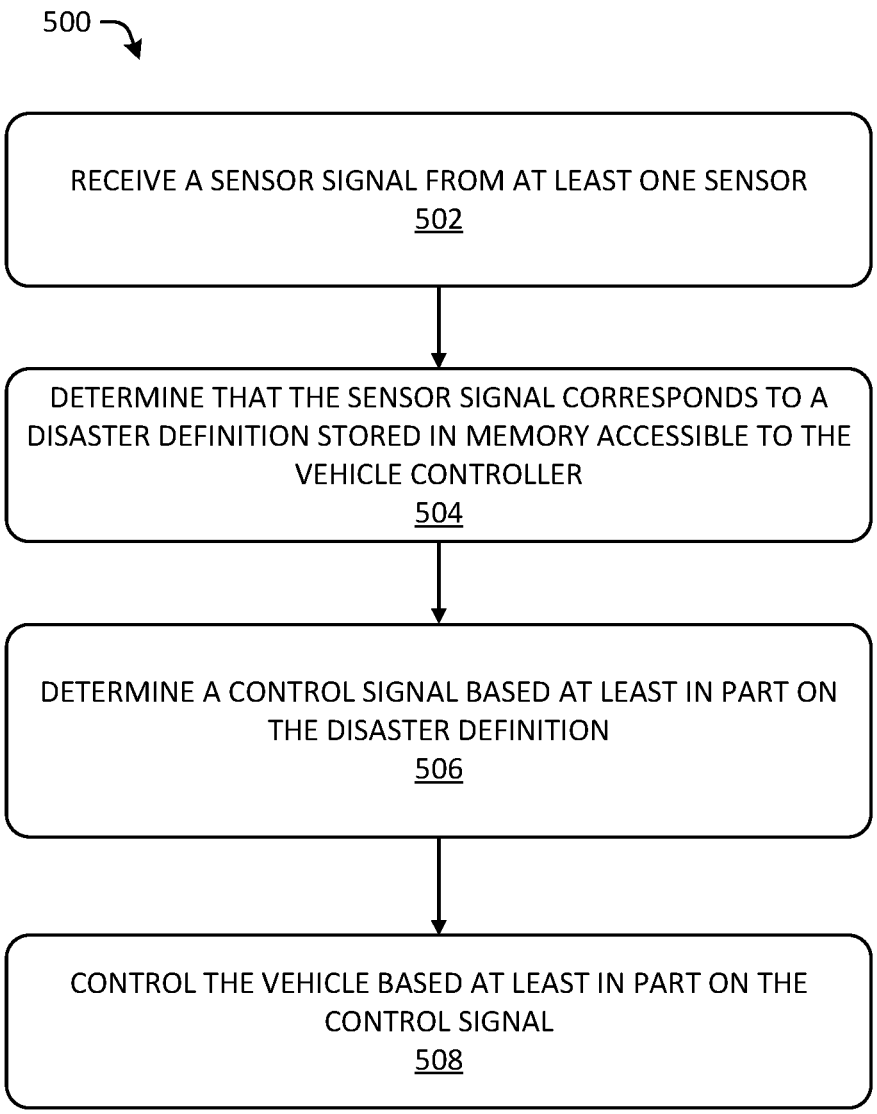
FIG. 5 illustrates a flow diagram of an example process for detecting a disaster at a autonomous vehicle and controlling the autonomous vehicle in response to a corroboration of the detection or an indication that the detection was a false positive.

FIG. 5 illustrates a flow diagram of an example process 500 for detecting a disaster at a autonomous vehicle and controlling the autonomous vehicle in response to a corroboration of the detection or an indication that the detection was a false positive.

At operation 502, the example process 500 may include receiving a sensor signal from at least one sensor, according to any of the techniques discussed herein.

At operation 504, the example process 500 may include determining that the sensor signal corresponds to a disaster definition stored in memory accessible to the vehicle controller, according to any of the techniques discussed herein. For example, the disaster definition may be stored in a memory of the autonomous vehicle and/or in a memory accessible to the autonomous vehicle via a network interface (e.g., received from a remote computing device and/or received from another autonomous vehicle).

At operation 506, the example process 500 may include determining a control signal for the vehicle, based at least in part on the disaster definition, according to any of the techniques discussed herein. In some examples, the disaster identification may indicate that the autonomous vehicle has detected a disaster condition at the autonomous vehicle. In some examples, the disaster identification may include a disaster type and/or a disaster state. In some examples, at 506, the autonomous vehicle may substantially contemporaneously alter a drive mode of the autonomous vehicle when the disaster identification is generated or transmitted. For example, the autonomous vehicle may initiate a "safe stop" mode of the autonomous vehicle, as discussed above.

At operation 508, the example process 500 may include controlling the vehicle based at least in part on the control signal, according to any of the techniques discussed herein.

Figure 6:
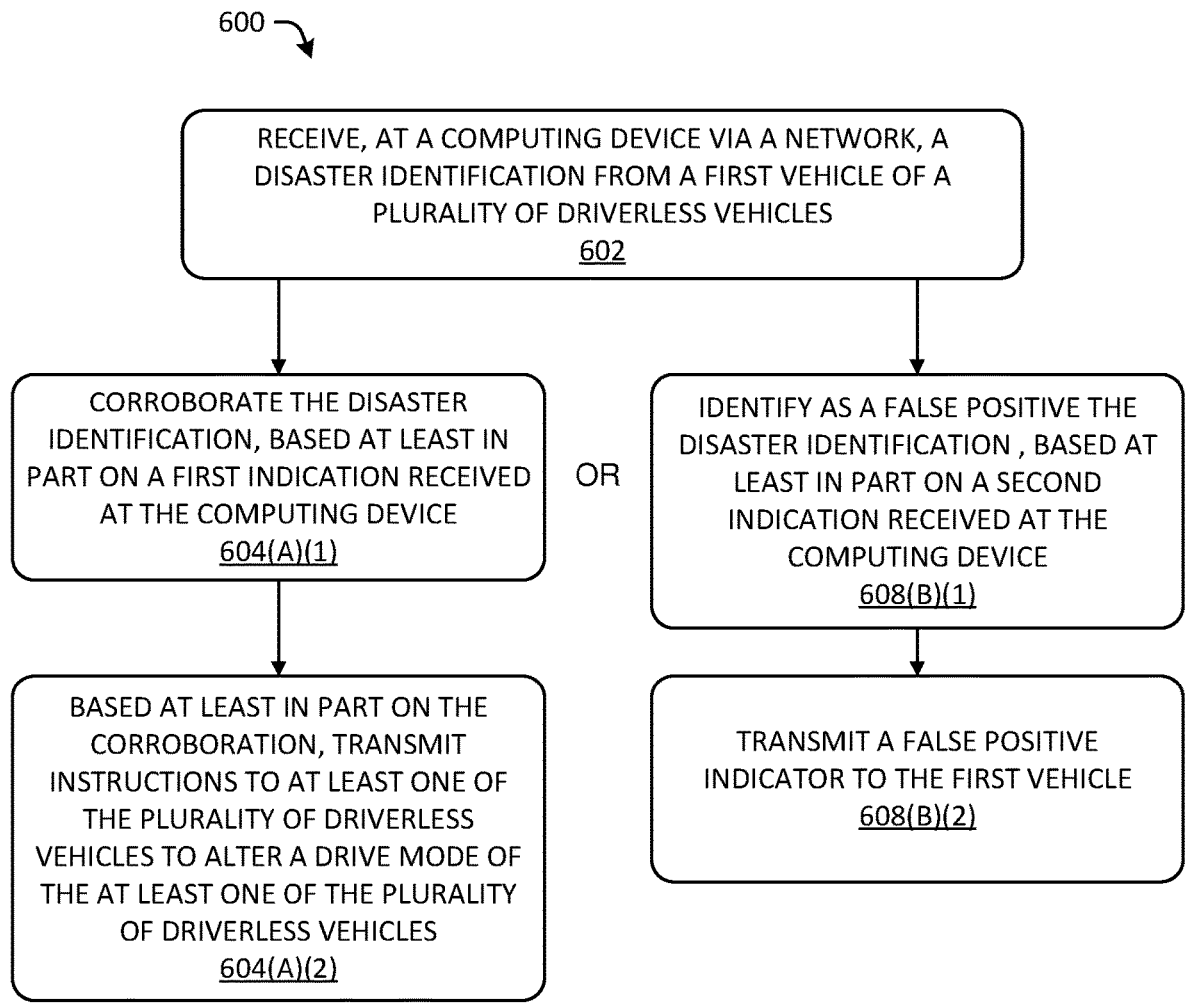
FIG. 6 illustrates a flow diagram of an example process for controlling movement of a plurality of autonomous vehicles when a disaster has been detected at a first vehicle of the plurality of autonomous vehicles.

FIG. 6 illustrates a flow diagram of an example process 600 for controlling movement of a plurality of autonomous vehicles when a disaster has been detected at a first vehicle of the plurality of autonomous vehicles.

At operation 602, the example process 600 may include receiving, at a computing device via a network, a disaster identification from a first vehicle of a plurality of autonomous vehicles, according to any of the techniques discussed herein. In some examples, additional disaster identifications may be received from additional vehicles. These may be used to corroborate or identify as a false positive at least one disaster identification.

At operation 604(A)(1), the example process 600 may include corroborating the disaster identification, based at least in part on a first indication received at the computing device, according to any of the techniques discussed herein. The first indication may include or be based on receiving user input at an I/O interface of the computing device, receiving data from another computing device (e.g., a notification from a third-party computing device, sensor data from a third-party computing device, sensor data from another autonomous vehicle), and/or a matching disaster identification generated by one or more other autonomous vehicles.

At operation 604(A)(2), the example process 600 may include transmitting instructions to at least one of the plurality of autonomous vehicles to alter a drive mode of at the least one of the plurality of autonomous vehicles, according to any of the techniques discussed herein. This may include transmitting the instructions to more than one or all the autonomous vehicles of a fleet. Instructions provided to different vehicles may command two different vehicles to enter distinct drive modes, in regard to each other.

At operation 604(B)(1), the example process 600 may include identifying as a false positive one or more of the disaster identification or the sensor signal, based at least in part on a second indication received at the computing device, according to any of the techniques discussed herein. The second indication may include or be based on receiving user input at an I/O interface of the computing device, receiving data from another computing device (e.g., a notification from a third-party computing device, sensor data from a third-party computing device, sensor data from another autonomous vehicle), and/or conflicting sensor data state data generated by one or more other autonomous vehicles.

At operation 604(B)(2), the example process 600 may include transmitting a false positive indicator to the first vehicle, according to any of the techniques discussed herein. In some examples, this indicator may be used to update a disaster definition and/or to release the first vehicle from a safe stop.

Figure 7:
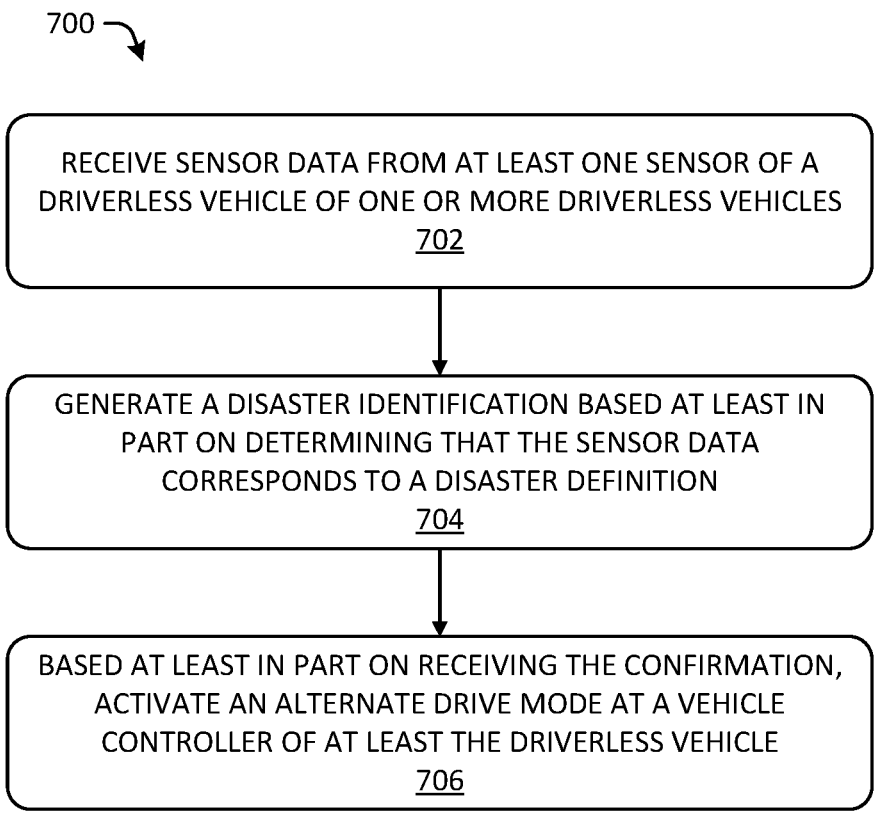
FIG. 7 illustrates a flow diagram of an example process for controlling one or more autonomous vehicles when a disaster is detected by a autonomous vehicle.

FIG. 7 illustrates a flow diagram of an example process 700 for controlling one or more autonomous vehicles when a disaster is detected by a autonomous vehicle.

At operation 702, the example process 700 may include receiving sensor data from at least one sensor of a first autonomous vehicle of the one or more autonomous vehicles, according to any of the techniques discussed herein. For example, the sensor data may be received at processor(s) of a autonomous vehicle via an I/O interface and/or the sensor data may be received by a remote computing device via a network interface.

At operation 704, the example process 700 may include generating a disaster identification based at least in part on determining that the sensor data corresponds to a disaster definition, according to any of the techniques discussed herein. For example, a autonomous vehicle and/or a remote computing device may conduct the determination and/or generation, according to any of the techniques discussed herein.

At operation 706, the example process 700 may include activating an alternate drive mode at a vehicle controller of at least the first autonomous vehicle, based at least in part on generating the disaster definition, according to any of the techniques discussed herein. Activating an alternative drive mode may include retrieving an instruction from a disaster definition and operating the planner of the vehicle controller according to the instruction. For example, the instruction may include altered constraints for generating possible trajectories to control the vehicle and/or altered constraints for selecting which of the possible trajectories to transmit to the drive system to control the vehicle. In some examples, operation 706 may additionally, or alternatively, determine if the vehicle is currently occupied (e.g. using interior vision systems, seat pressure sensors, seatbelt sensors, etc.) and using that information to choose an alternate drive mode. In such examples, the alternate drive mode may be additionally based on the presence of a passenger and/or any other state data about the vehicle. Put simply, instructions stored in a corresponding disaster definition may alter an operation construct (i.e., mission) of the autonomous vehicle.

In some examples, a autonomous vehicle may transmit the disaster identification to a remote computing device and/or a second autonomous vehicle and may receive the confirmation of the disaster identification from the remote computing device and/or the second autonomous vehicle. In an additional or alternate example, the remote computing device may receive a confirmation of the disaster identification by causing display of sensor data, environmental data, and/or fleet data at a teleoperations device and/or receiving an indication of a confirmation of the disaster identification from a teleoperator via an input device. In some examples, the autonomous vehicle may request confirmation of the disaster identification from a passenger by, for example, input devices located within the vehicle (e.g. buttons, touch screens, etc.) and/or input devices of the passenger (e.g. a smartphone).

EXAMPLE CLAUSES

A. A vehicle comprising: at least one sensor; and a vehicle controller operably connected to the at least one sensor and a drive system to control operation of the vehicle, the vehicle controller being configured to: receive a sensor signal from the at least one sensor; determine that the sensor signal corresponds to a disaster definition accessible to the vehicle controller; determine a control signal based at least in part on the disaster definition; and control the vehicle based at least in part on the control signal.

B. The vehicle of paragraph A, wherein the vehicle is a autonomous vehicle, the vehicle controller further configured to: transmit, via a network interface, a disaster identification to the remote computing device, the disaster identification comprising a disaster type or disaster state and indicating that the autonomous vehicle has detected a disaster condition at the autonomous vehicle; and receive a confirmation of the disaster identification from the remote computing device, the control signal comprising a signal to control the autonomous vehicle according to a drive mode that corresponds to the disaster definition, or receive an indication from the remote computing device that the disaster identification is a false positive and control the autonomous vehicle according to a nominal drive mode.

C. The vehicle of paragraph B, wherein the remote computing device is one or more of another vehicle, a teleoperations device, or a passenger device.

D. The vehicle as either paragraph B or C recites, wherein the disaster type includes one or more of: a cyclone, elevated radiation levels, a flood, seismic activity, a fire, a sinkhole, a projectile collision, aberrant human activity, or an explosion.

E. The vehicle as any one of paragraphs B-D recites, wherein the disaster state includes an indication of one or more of an advanced notice of a pre-disaster condition, ongoing disaster, or post-disaster.

F. The vehicle as any one of paragraphs A-E recites, wherein: the sensor signal includes a camera signal, and determining that the sensor signal corresponds to the disaster definition accessible to the vehicle controller includes one or more of: identifying a portion of the camera signal that corresponds to vegetation, determining, as an energy determination, that a characteristic of energy of the portion is indicative of one or more of dry vegetation or an ongoing fire, and based at least in part on the energy determination, transmitting an indication that pre-fire conditions or an ongoing fire exist.

G. The vehicle as paragraph B recites, wherein the drive mode that corresponds to the disaster definition includes one or more of: generating a new route for controlling the autonomous vehicle that does not include an area associated with the disaster; identifying a first geophysical location that has an elevation that is higher than a current elevation of the autonomous vehicle and controlling the autonomous vehicle to drive to the first geophysical location; identifying a second geophysical location that indicates an overpass and controlling the autonomous vehicle to drive to the second geophysical location and park under the overpass; controlling the autonomous vehicle to permit another object to pass; controlling the autonomous vehicle to push or pull an object; outputting a signal via an output device of the autonomous vehicle notifying a surrounding area of the vehicle of the disaster identification; and controlling the autonomous vehicle according to a shuttle mode that includes: releasing passengers at a destination, generating a route away from the destination and towards the disaster, monitoring sensor signals for potential passengers, and returning to the destination based at least in part on obtaining a new passenger or detecting a maximum passenger capacity.

H. The vehicle as any one of paragraphs A-G recites, the vehicle controller further configured to: cause at least a portion of the sensor signal to be recorded; and use one or more of the disaster identification or the at least the portion to determine that a subsequent sensor signal corresponds to one or more of a disaster type or a disaster state.

I. The vehicle as any one of paragraphs A-H recites, the vehicle controller further configured to: determine that a network for transmitting one or more of at least a portion of the sensor signal or the disaster identification to the remote computing device is degraded; establish an ad hoc network with a second vehicle; transmit, via the ad hoc network, one or more of at least a portion of the sensor signal or the disaster identification to the second vehicle; and receive, via the ad hoc network, a confirmation of the disaster identification from the second vehicle or the remote computing device.

J: The vehicle of paragraph I, wherein the vehicle controller is further configured to: determine the vehicle is occupied if one or more passengers are located within the vehicle; and relay messages via the ad hoc network indicating the passenger safety, wherein the control signal is determined based at least in part on the vehicle being occupied.

K. A system comprising: a computing device in communication with at least a portion of the plurality of autonomous vehicles via a network, the computing device being configured to: receive, at the computing device via the network, a disaster identification from a first vehicle of the plurality of autonomous vehicles; and either: corroborate, as a corroboration, the disaster identification, based at least in part on a first indication received at the computing device and, based at least in part on the corroboration, transmit instructions to at least one of the plurality of autonomous vehicles to alter a drive mode of the at least one of the plurality of autonomous vehicles; or identify as a false positive the disaster identification, based at least in part on a second indication received at the computing device and transmit a false positive indicator to the first vehicle.

L. The system of paragraph K, wherein the disaster identification is a first disaster identification and corroborating the disaster identification includes one or more of: receiving a sensor signal from one or more of the first vehicle or a second vehicle of the plurality of autonomous vehicles; receiving teleoperator input that verifies the disaster identification; comparing the sensor signal and a historical sensor signal accessible to the computing device to determine that a match score between the sensor signal and the historical sensor signal meets a threshold match score; determining that the sensor signal corresponds to a disaster definition stored at the remote computing device; receiving a second disaster identification from the second vehicle; or receiving a notification or a signal from a third-party device.

M. The system of either paragraph K or L, the computing device being further configured to transmit a notification of the disaster identification to a third-party device.

N. The system of any one of paragraphs K-M, wherein altering the drive mode of the at least one of the plurality of autonomous vehicles includes transmitting instructions to enter one or more of: a high ground-seeking mode, a disaster area avoidance mode, a shelter-seeking mode, a shuttle mode, an alternate vehicle prioritization mode, an object clearance mode, a high speed mode, or an ad hoc network positioning mode.

O. The system of any one of paragraphs K-N, the computing device being further configured to: determine a first subset of the plurality of autonomous vehicles to devote to a first alternate drive mode; determine a second subset of the plurality of autonomous vehicles to devote to a second alternate drive mode, the second alternate drive mode being different than the first alternate drive mode; and transmitting first instructions to the first subset and second instructions to the second subset corresponding to the first alternate drive mode and the second alternate drive mode, respectively.

P. A method of controlling one or more autonomous vehicles, the method comprising: receiving sensor data from at least one sensor of a autonomous vehicle of the one or more autonomous vehicles; generating a disaster identification based at least in part on determining that the sensor data corresponds to a disaster definition; and based at least in part on generating the disaster identification, activating an alternate drive mode at a vehicle controller of at least the autonomous vehicle.

Q. The method that paragraph P recites, wherein the alternate drive mode configures the vehicle controller to alter operation of the autonomous vehicle to include one or more of: determining a disaster location associated with the disaster identification; generating a new route for controlling the autonomous vehicle that does not include an area associated with the disaster location; identifying a first geophysical location that has an elevation that is higher than a current elevation of the autonomous vehicle and controlling the autonomous vehicle to drive to the first geophysical location; identifying a second geophysical location that indicates an overpass and controlling the autonomous vehicle to drive to the second geophysical location and park under the overpass; controlling the autonomous vehicle to permit another object to pass; controlling the autonomous vehicle to push or pull an object; outputting a signal via an output device of the autonomous vehicle notifying a surrounding area of the vehicle of the disaster identification; and controlling the autonomous vehicle according to a shuttle mode that includes: releasing passengers at a destination, generating a route away from the destination and towards the disaster location, monitoring a sensor signal for potential passengers, and returning to the destination based at least in part on obtaining a new passenger or detecting a maximum passenger capacity.

R. The method as either paragraph P or Q recites, wherein: the sensor data includes a camera signal, and determining that the sensor data corresponds to the disaster definition includes: identifying a portion of the camera signal that corresponds to vegetation, and determining that a characteristic of energy of the portion corresponding to vegetation is indicative of one or more of dry vegetation or an ongoing fire.

S. The method as paragraph Q recites, wherein: the sensor data includes inertial measurement unit (IMU) measurements, and determining that the sensor data corresponds to the disaster definition includes: determining that one or more of angular rate or acceleration meets one or more of a threshold magnitude or a threshold duration, and based at least in part on determining that one or more of angular rate or acceleration meets one or more of a threshold magnitude or a threshold duration, generating an indication of one or more of an early warning of seismic activity or ongoing seismic activity.

T. The method as paragraph S recites, wherein: the sensor data includes inertial measurement unit (IMU) measurements from multiple vehicles, the disaster identification is a seismic activity identification, and the method further comprises determine one or more characteristics of the seismic activity.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The modules described herein represent instructions that can be stored in any type of computer-readable medium and can be implemented in software and/or hardware. All of the methods and processes described above can be embodied in, and fully automated via, software code modules and/or computer-executable instructions executed by one or more computers or processors, hardware, or some combination thereof. Some or all of the methods can alternatively be embodied in specialized computer hardware.

Conditional language such as, among others, "can," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. can be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art.

It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A vehicle comprising:
   at least one sensor; and
   a vehicle controller operably connected to the at least one sensor and a drive system to control operation of the vehicle, the vehicle controller being configured to:

receive a sensor signal from the at least one sensor;
determine that the sensor signal corresponds to a disaster definition accessible to the vehicle controller;
determine a control signal based at least in part on the disaster definition; and
control the drive system of the vehicle to follow a trajectory based at least in part on the control signal.

2. The vehicle of claim 1, wherein the vehicle is an autonomous vehicle, the vehicle controller further configured to:
transmit, via a network interface, a disaster identification to a remote computing device, the disaster identification comprising a disaster type or disaster state and indicating that the autonomous vehicle has detected a disaster condition at the autonomous vehicle; and
receive a confirmation of the disaster identification from the remote computing device, the control signal comprising a signal to control the autonomous vehicle according to a drive mode that corresponds to the disaster definition, or
receive an indication from the remote computing device that the disaster identification is a false positive and control the autonomous vehicle according to a nominal drive mode.

3. The vehicle of claim 2, wherein the remote computing device is one or more of another vehicle, a teleoperations device, or a passenger device.

4. The vehicle as claim 1 recites, wherein the disaster definition is associated with a disaster type, the disaster type comprising at least one of:
a cyclone,
elevated radiation levels,
a flood,
seismic activity,
a fire,
a sinkhole,
a projectile collision,
aberrant human activity, or
an explosion.

5. The vehicle as claim 2 recites, wherein the disaster state includes an indication of one or more of an advanced notice of a pre-disaster condition, ongoing disaster, or post-disaster.

6. The vehicle as claim 1 recites, wherein:
the sensor signal includes a camera signal, and
determining that the sensor signal corresponds to the disaster definition accessible to the vehicle controller comprises at least one of:
identifying a portion of the camera signal that corresponds to vegetation;
determining, as an energy determination, that a characteristic of energy of the portion is indicative of one or more of dry vegetation or an ongoing fire; or
based at least in part on the energy determination, transmitting an indication that pre-fire conditions or an ongoing fire exist.

7. The vehicle as claim 1 recites, wherein the vehicle is an autonomous vehicle, the control signal comprising a signal to control the autonomous vehicle according to a drive mode that corresponds to the disaster definition, and controlling the drive mode comprises at least one of:
generating a new route for controlling the autonomous vehicle that does not include an area associated with the disaster definition;
identifying a first geophysical location that has an elevation that is higher than a current elevation of the autonomous vehicle and controlling the autonomous vehicle to drive to the first geophysical location;
identifying a second geophysical location that indicates an overpass and controlling the autonomous vehicle to drive to the second geophysical location and park under the overpass;
controlling the autonomous vehicle to permit another object to pass;
controlling the autonomous vehicle to push or pull an object; or
outputting a signal via an output device of the autonomous vehicle notifying a surrounding area of the vehicle of the disaster identification; and
controlling the autonomous vehicle according to a shuttle mode that includes:
releasing a passenger at a destination,
generating a route away from the destination and towards the surrounding area of the vehicle of the disaster identification,
monitoring sensor signals for a potential passenger, and
returning to the destination based at least in part on obtaining a new passenger or detecting a maximum passenger capacity.

8. The vehicle as claim 1 recites, the vehicle controller further configured to:
cause at least a portion of the sensor signal to be recorded; and
use one or more of a disaster identification or the at least the portion to determine that a subsequent sensor signal corresponds to one or more of a disaster type or a disaster state.

9. The vehicle as claim 1 recites, the vehicle controller further configured to:
determine that a network for transmitting one or more of at least a portion of the sensor signal or disaster identification to a remote computing device is degraded;
establish an ad hoc network with a second vehicle;
transmit, via the ad hoc network, one or more of at least a portion of the sensor signal or the disaster identification to the second vehicle; and
receive, via the ad hoc network, a confirmation of the disaster identification from the second vehicle or the remote computing device.

10. The vehicle of claim 9, wherein the vehicle controller is further configured to:
determine the vehicle is occupied if one or more passengers are located within the vehicle; and
relay messages via the ad hoc network indicating passenger safety, wherein the control signal is determined based at least in part on the vehicle being occupied.

11. A system comprising:
a computing device in communication with at least a portion of a plurality of autonomous vehicles via a network, the computing device being configured to:
receive, at the computing device via the network, a disaster identification from a first vehicle of the plurality of autonomous vehicles; and
either:
corroborate, as a corroboration, the disaster identification, based at least in part on a first indication received at the computing device and, based at least in part on the corroboration, transmit instructions to at least one of the plurality of autonomous vehicles to alter a drive mode of the at least one of the plurality of autonomous vehicles, the drive mode associated with a trajectory of the at least one of the plurality of autonomous vehicles; or identify as a false positive the disaster identification, based at least in part on a second indication received at the computing device and transmit a false positive indicator to the first vehicle.

12. The system of claim 11, wherein the disaster identification is a first disaster identification and corroborating the disaster identification includes one or more of:
   receiving a sensor signal from one or more of the first vehicle or a second vehicle of the plurality of autonomous vehicles;
   receiving teleoperator input that verifies the disaster identification;
   comparing the sensor signal and a historical sensor signal accessible to the computing device to determine that a match score between the sensor signal and the historical sensor signal meets a threshold match score;
   determining that the sensor signal corresponds to a disaster definition stored at the computing device;
   receiving a second disaster identification from the second vehicle; or
   receiving a notification or a signal from a third-party device.

13. The system of claim 11, the computing device being further configured to transmit a notification of the disaster identification to a third-party device.

14. The system of claim 11, wherein altering the drive mode of the at least one of the plurality of autonomous vehicles includes transmitting instructions to enter one or more of:
   a high ground-seeking mode,
   a disaster area avoidance mode,
   a shelter-seeking mode,
   a shuttle mode,
   an alternate vehicle prioritization mode,
   an object clearance mode,
   a high speed mode, or
   an ad hoc network positioning mode.

15. The system of claim 11, the computing device being further configured to:
   determine a first subset of the plurality of autonomous vehicles to devote to a first alternate drive mode;
   determine a second subset of the plurality of autonomous vehicles to devote to a second alternate drive mode, the second alternate drive mode being different than the first alternate drive mode; and
   transmitting first instructions to the first subset and second instructions to the second subset corresponding to the first alternate drive mode and the second alternate drive mode, respectively.

16. A method of controlling one or more autonomous vehicles, the method comprising:
   receiving sensor data from at least one sensor of an autonomous vehicle of the one or more autonomous vehicles;
   generating a disaster identification based at least in part on determining that the sensor data corresponds to a disaster definition;
   receiving data indicative of a trajectory based at least in part on the disaster definition and the sensor data; and
   based at least in part on generating the disaster identification and receiving the data indicative of the trajectory, activating an alternate drive mode at a vehicle controller of at least the autonomous vehicle.

17. The method that claim 16 recites, wherein the alternate drive mode configures the vehicle controller to alter operation of the autonomous vehicle to include one or more of:
   determining a disaster location associated with the disaster identification;
   generating a new route for controlling the autonomous vehicle that does not include an area associated with the disaster location;
   identifying a first geophysical location that has an elevation that is higher than a current elevation of the autonomous vehicle and controlling the autonomous vehicle to drive to the first geophysical location;
   identifying a second geophysical location that indicates an overpass and controlling the autonomous vehicle to drive to the second geophysical location and park under the overpass;
   controlling the autonomous vehicle to permit another object to pass;
   controlling the autonomous vehicle to push or pull an object; or
   outputting a signal via an output device of the autonomous vehicle notifying a surrounding area of the vehicle of the disaster identification; and
   controlling the autonomous vehicle according to a shuttle mode that includes:
      releasing passengers at a destination,
      generating a route away from the destination and towards the disaster location,
      monitoring a sensor signal for potential passengers, and
      returning to the destination based at least in part on obtaining a new passenger or detecting a maximum passenger capacity.

18. The method as claim 16 recites, wherein:
   the sensor data includes a camera signal, and
   determining that the sensor data corresponds to the disaster definition includes:
      identifying a portion of the camera signal that corresponds to vegetation, and
      determining that a characteristic of energy of the portion corresponding to vegetation is indicative of one or more of dry vegetation or an ongoing fire.

19. The method as claim 16 recites, wherein:
   the sensor data includes inertial measurement unit (IMU) measurements, and determining that the sensor data corresponds to the disaster definition includes:
      determining that one or more of angular rate or acceleration meets one or more of a threshold magnitude or a threshold duration, and
      based at least in part on determining that one or more of angular rate or acceleration meets one or more of a threshold magnitude or a threshold duration, generating an indication of one or more of an early warning of seismic activity or ongoing seismic activity.

20. The method as claim 19 recites, wherein:
   the sensor data includes inertial measurement unit (IMU) measurements from multiple vehicles,
   the disaster identification is a seismic activity identification, and
   the method further comprises determining one or more characteristics of the seismic activity.

21. The vehicle of claim 1, wherein the control signal is associated with a drive mode of the vehicle to alter a default mission of the vehicle.

* * * * *